July 21, 1925.
S. POULSEN
TROLLING SPOON
Filed Sept. 9, 1924
1,546,673
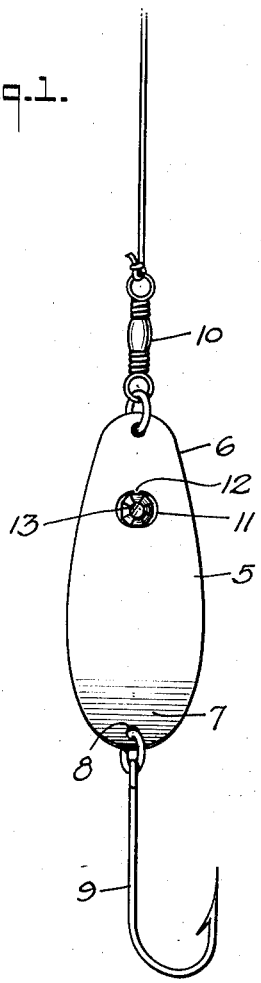
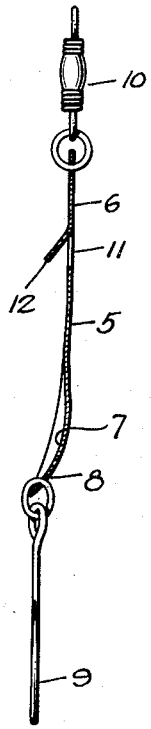
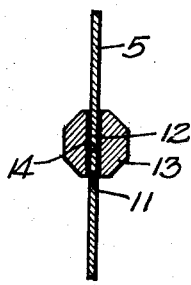
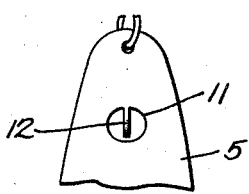
Inventor
SOREN POULSEN
By
Attorneys Patented July 21, 1925.

1,546,673

UNITED STATES PATENT OFFICE.

SOREN POULSEN, OF TACOMA, WASHINGTON.

TROLLING SPOON.

Application filed September 9, 1924. Serial No. 736,753.

*To all whom it may concern:*

Be it known that I, SOREN POULSEN, a citizen of the United States, and a resident of Tacoma, in the State of Washington, have invented certain new and useful Improvements in Trolling Spoons, of which the following is a specification.

This invention relates to trolling spoons, and has for its primary object the provision of a device of this character of the so-called movable variety having novel means for attaching an artificial lure thereto and for supporting the same therefrom, so that it will be clearly discernible from both sides of the spoon as the latter functions in the water.

A further object of the invention is to provide a spoon of this character which shall be simple and inexpensive of construction and provided with means to permit the lure to be quickly attached and firmly secured in position to the spoon when assembling the device.

A further object of the invention is to provide a trolling spoon wherein the lure supporting means thereof is formed as an integral part of the spoon and constructed to hold the lure against casual displacement when the spoon is in use.

In the drawings—

Figure 1 is a view in front elevation of the spoon;

Figure 2 is a vertical section therethrough showing the lure supporting tongue in its normal or initial position;

Figure 3 is a similar view on an enlarged scale through a portion of the spoon, showing the tongue adjusted to hold the lure in operative confinement within the spoon, and Figure 4 is a view similar to Figure 3 but taken at right angles thereto.

I employ a spoon 5 formed of brass or suitable well known material, and provided with a flat upper portion 6 and a lower bowl portion 7, the latter cupped by pressing the spoon against a suitable die. The base of the bowl 7 is formed with an eye 8 from which a hook 9 is supported. The upper end of the portion 6 is connected to a swivel 10 in the usual manner.

Medially of the portion 6 and stamped therein is a lure accommodating opening 11 and struck up from the portion with the boundary of said opening 11 is a bendable tongue 12. This tongue is free at its lower end, and as shown in Figure 2, same is offset normally from one side of said opening 11. The tongue traverses the opening, and due to its normal offset relation with respect thereto, a colored bead 13 having an eye 14 can be passed onto said tongue and the latter pressed into the plane of the portion 6. This locks the bead in position to prevent casual loss thereof and mounts the bead in said opening 11 so that portions of equal size thereof are respectively exposed from the opposite sides of said portion 6.

In the manufacture of the device, the operation of assembling the parts can be carried on with dispatch, and should a bead become broken in use, same can be quickly replaced by a new one at a negligible expense. The manner of mounting the bead causes same to be clearly discernible from both sides of the spoon as the latter functions in the water.

I claim:

1. A trolling spoon having an opening formed therein, and means upstruck from the spoon and co-acting with the opening to support a lure and position same in said opening and for locking same in confinement therewith, said means being in the form of a tongue traversing the opening and having a free end.

2. A trolling spoon having an opening formed therein, and means upstruck from the spoon and co-acting with the opening to support a lure and position same in said opening and for locking same in confinement therewith, said means being in the form of a tongue traversing the opening and offset therefrom and adapted to be pressed into said opening.

3. A trolling spoon having an opening, a bendable tongue traversing the opening, and a bead having an eye receiving the tongue, said tongue serving to hold the bead in the opening and cause portions thereof to be respectively exposed from the opposite sides of the spoon.

SOREN POULSEN.